United States Patent
Maxey

[11] Patent Number: 6,155,588
[45] Date of Patent: Dec. 5, 2000

[54] TILTING HITCH FOR TRAILER

[76] Inventor: Vernon Maxey, 2322 N. 83rd La., Kansas City, Kans. 66109

[21] Appl. No.: 09/192,968

[22] Filed: Nov. 16, 1998

[51] Int. Cl.[7] .................................................. B60D 13/00
[52] U.S. Cl. ...................... 280/488; 280/468; 280/491.1
[58] Field of Search ................................... 280/468, 402, 280/490.1, 491.1, 491.4, 491.5, 483, 484, 485, 488, 489

[56] References Cited

U.S. PATENT DOCUMENTS

| | | |
|---|---|---|
| 4,000,911 | 1/1977 | Weber ...................................... 280/468 |
| 4,057,265 | 11/1977 | Grace . |
| 4,113,272 | 9/1978 | Sebby ...................................... 280/402 |
| 4,564,209 | 1/1986 | Kingsley et al. . |
| 4,572,315 | 2/1986 | Caron .................................. 280/468 X |
| 4,805,927 | 2/1989 | Stephenson et al. . |
| 4,929,028 | 5/1990 | Underwood . |
| 4,946,182 | 8/1990 | Weber . |
| 5,226,657 | 7/1993 | Dolphin . |
| 5,269,553 | 12/1993 | Alonzo .................................... 280/402 |
| 5,401,047 | 3/1995 | Dettling, Jr. . |

FOREIGN PATENT DOCUMENTS 1201892  8/1970  United Kingdom ................... 280/489

*Primary Examiner*—Brian L. Johnson
*Assistant Examiner*—Bryan Fischmann
*Attorney, Agent, or Firm*—Kyle L. Elliott; Blackwell Sanders Peper Martin LLP

[57] ABSTRACT

The tilting trailer hitch (10) includes a compressible main support assembly (22) having a hitch coupler (24) and a hitching mechanism (26) attached thereto. The hitch coupler (24) is configured to connect a towing connector (92) to a towing vehicle (94) and the hitching mechanism (26) is configured to couple with a trailer (12). An actuator (28) is pivotally connected to the main support assembly (22) in response to trailer loading and is operable to rotate part of the main support assembly (22), thereby raising or lowering the hitching mechanism (26) along a generally arcuate path (116). When the hitching mechanism (26) is in the raised position, a loading end (20) of the trailer (12) is lowered to assist in loading the trailer (12).

20 Claims, 3 Drawing Sheets

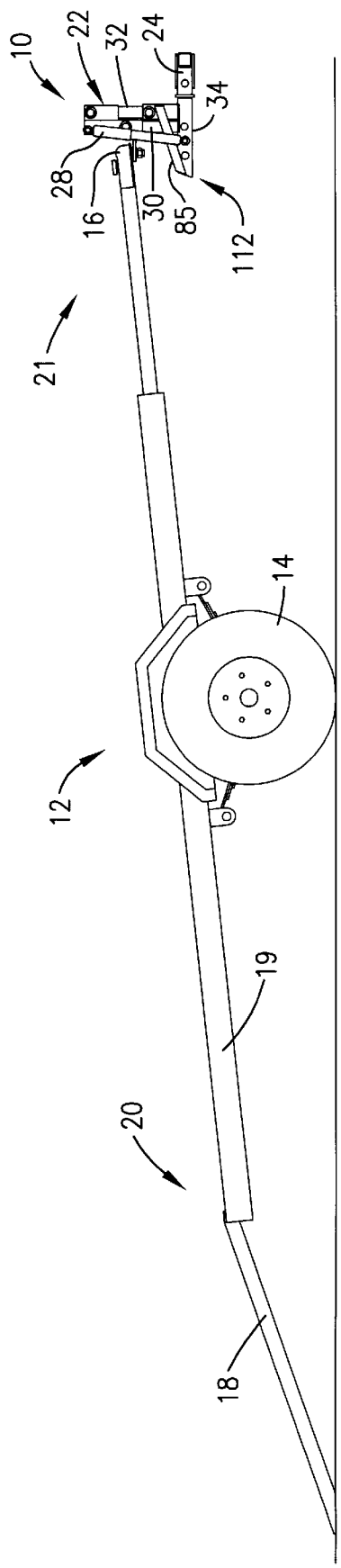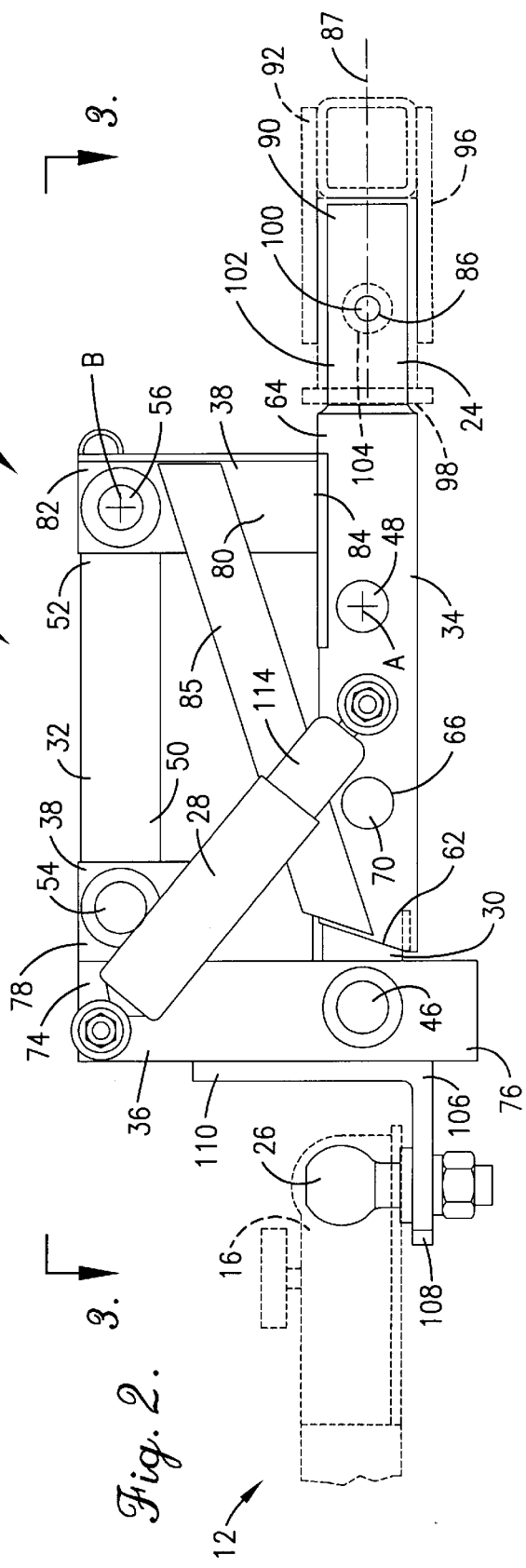

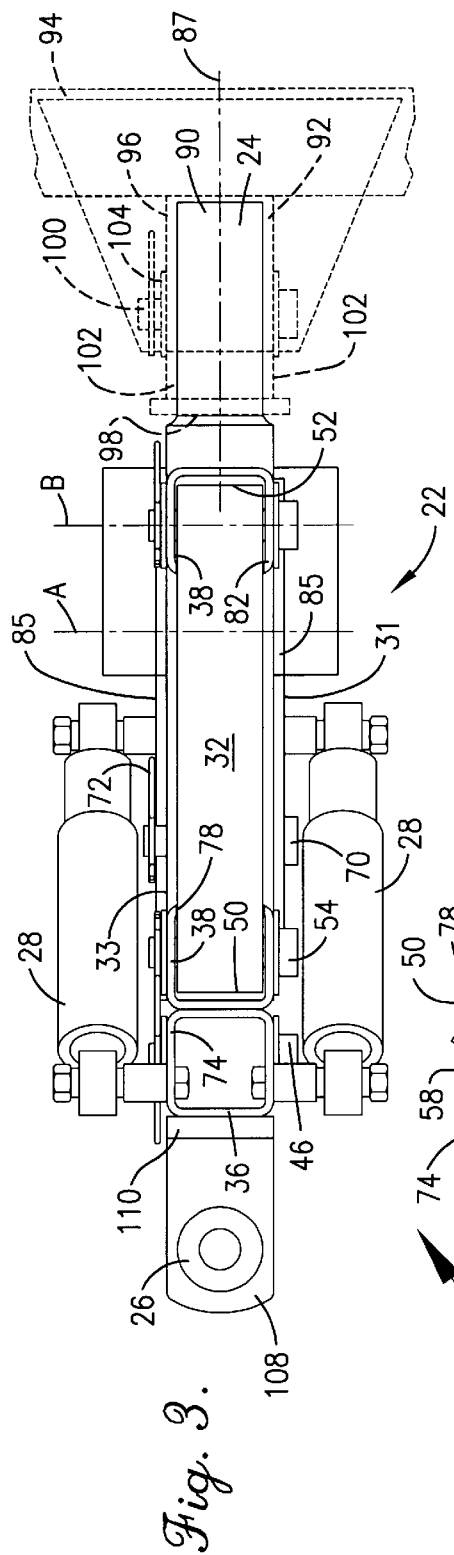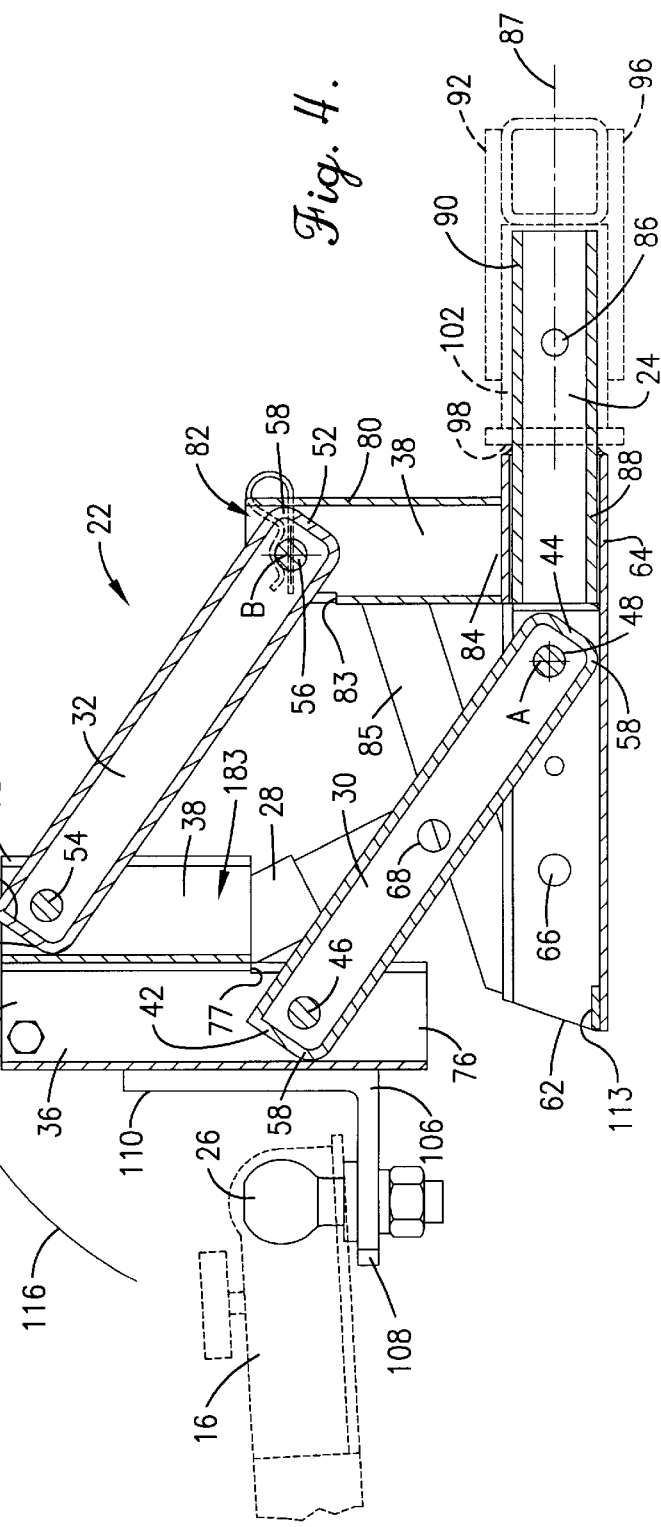

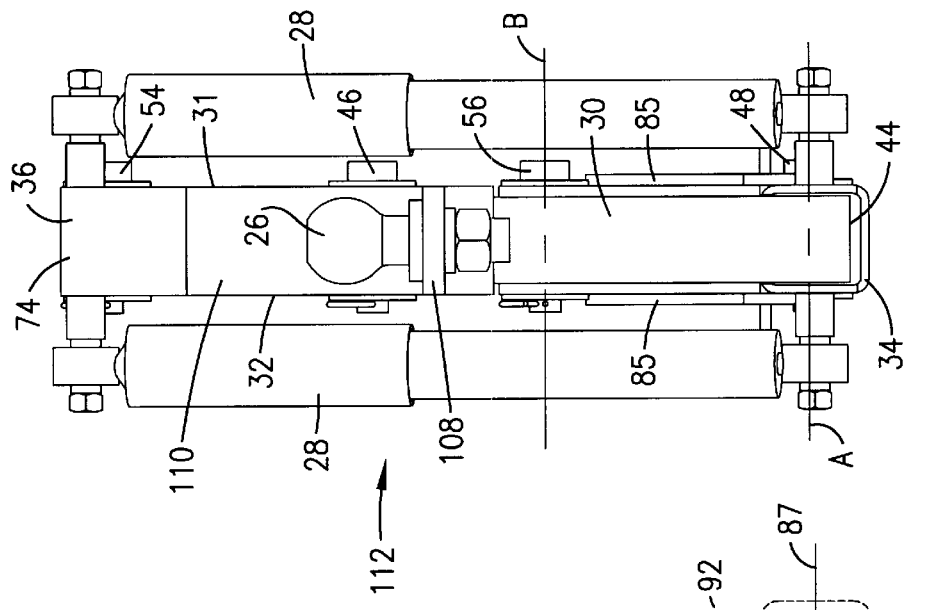
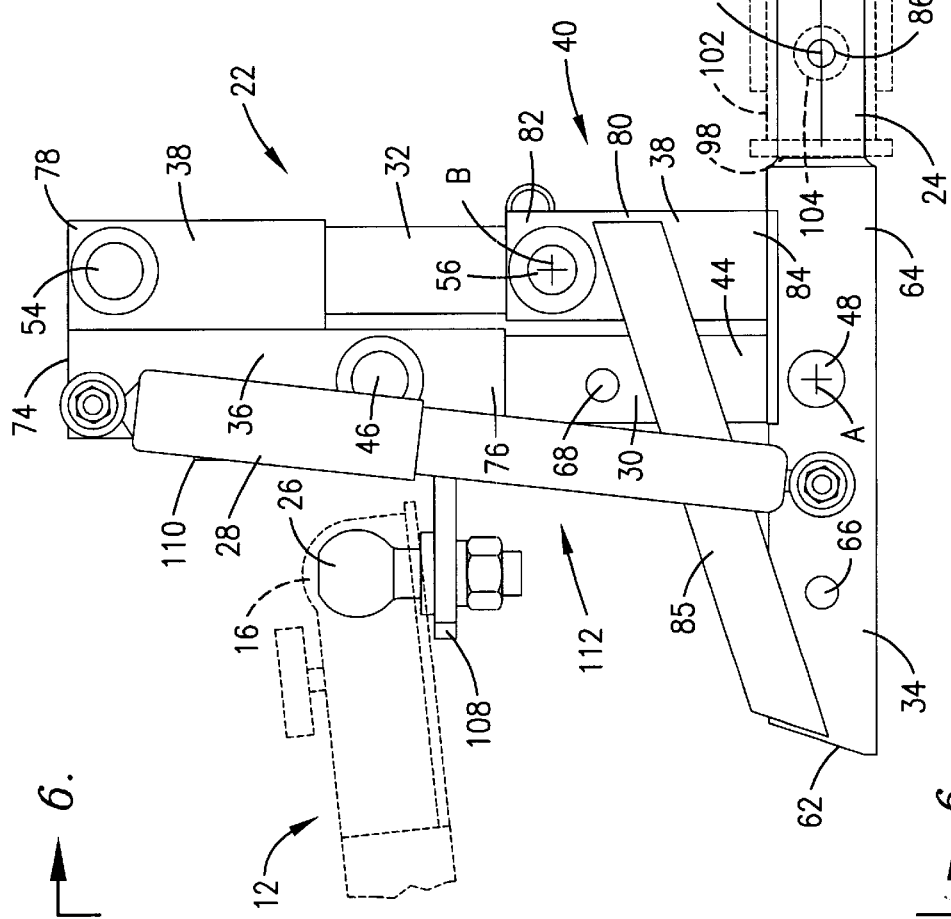

6,155,588

TILTING HITCH FOR TRAILER

BACKGROUND OF THE INVENTION

This invention relates to the field of hitches. More particularly, the invention is concerned with hitches attachable to a towing vehicle which are able to tilt a trailer for easier loading and unloading.

Trailers transport many different types of payloads. Some payloads, such as automobiles or construction equipment, roll on and off the loading end of the trailer. Other payloads are pulled onto a trailer such as boats or watercraft. To load a trailer attached to a towing vehicle requires a method of raising the payload to the height of the trailer platform. Usually long ramps are used to roll equipment or automobiles up the short height, but this requires hauling the bulky and cumbersome ramps with the trailer. Also, if the payload is an automobile, using ramps of insufficient length can cause the bottom of the automobile to be scraped by the trailer's rear edge. Further, it is time consuming to move and properly position the long ramps at the loading end of the trailer. Another problem is that ramps must be specially constructed to fit each different type of trailer, in many cases ramps cannot be interchanged between trailers.

One way to eliminate the problems associated with using longer ramps is elevating the hitching end of the trailer so as to allow equipment or a vehicle to roll up onto the trailer using shorter ramps. Unfortunately, most vehicles used for towing are equipped with ball-like hitches that are fixedly anchored to the vehicle. Thus, once the trailer is attached, there would be no easy way of tilting the trailer to allow smaller ramps to be used to facilitate loading and unloading of the payload.

SUMMARY OF THE INVENTION

The present invention solves the problems mentioned above and provides a distinct advance in the state of the art. In particular, the tilting trailer hitch hereof allows a trailer to be tilted for easier payload loading and unloading.

The tilting trailer hitch of the present invention broadly includes a compressible main support assembly having pivot connections. A hitch coupler and a hitching mechanism are attached to the main support assembly. The hitch coupler is configured to connect the trailer hitch to a towing vehicle and the hitching mechanism is configured to couple with a trailer. An actuator is pivotally connected to the main support assembly and is operable to rotate part of the main support assembly, thereby raising or lowering the hitching mechanism along a generally arcuate path.

In preferred forms, the main support assembly has upper and lower rotatable arms, a base, and first and second vertical shafts defining a frame. The frame is constructed from rectangular tube-like shafts. Preferably two actuators are provided which comprise a pair of pneumatic shocks. When the force applied to the hitching mechanism is less than a predetermined amount of force, the shocks will rotate a portion of the main support assembly to an extended position, and as force greater than the predetermined amount is applied, the shocks gradually lower the hitching mechanism along the arcuate path to a retracted position. When the trailer is fully loaded, the hitching mechanism will be in a lowermost position.

BRIEF DESCRIPTION OF THE DRAWINGS

FIG. 1 is a side view of the preferred tilting trailer hitch in the up position in accordance with the present invention in combination with a trailer;

FIG. 2 is a side view of the tilting trailer hitch of FIG. 1 in the down position;

FIG. 3 is a top view of the tilting trailer hitch of FIG. 1 in the down position;

FIG. 4 is a longitudinal sectional view of the tilting trailer hitch of FIG. 1 in an intermediate position;

FIG. 5 is a side view of the tilting trailer hitch of FIG. 1 in the up position; and FIG. 6 is an end view of the tilting trailer hitch of FIG. 1 in the up position.

DETAILED DESCRIPTION OF THE PREFERRED EMBODIMENTS

Referring initially to FIG. 1, the drawing figure illustrates a preferred tilting trailer hitch 10 in combination with a trailer 12 in accordance with the present invention. The trailer 12 includes a pair of wheels 14, which act like a fulcrum, a trailer hitch 16, preferably a ball hitch socket, a ramp 18, and a trailer platform 1,9. The trailer further includes a loading end 20 and a towing end 21.

Referring to FIGS. 2–5, the tilting trailer hitch 10 includes a main support assembly 22, a hitch coupler 24, a hitching mechanism 26 and at least one actuator 28. The main support assembly 22 includes a lower rotatable arm 30, an upper rotatable arm 32, a first side 31, a second side 33, a base 34, a first vertical shaft 36 and a second vertical shaft 38. The second vertical shaft 38 includes an upper member 78 and a lower member 80. The arms 30,32, base 34 and shafts 36,38 define a four-sided frame 40.

The lower rotatable arm 30, having first and second ends 42,44, is pivotally connected at the first end 42 to the first vertical shaft 36 by fastener 46, and the second end 44 is pivotally connected to the base 34 by fastener 48. The upper rotatable arm 32, having first and second ends 50,52, is pivotally connected at each end 50,52 to the second vertical shaft members 78,80 by fasteners 54,56 respectively. The lower rotatable arm 30 rotates about and axis A which corresponds with fastener 48. The upper rotatable arm 32 rotates about an axis B which corresponds with fastener 56. Each fastener 46,48,54,56 consists of a linchpin and a clip. Alternatively, the fasteners could be a nut and bolt.

The lower and upper rotatable arms 30,32 are formed from rectangular tubing. Each of the ends 42,44,50,52 are closed with rounded corners 58. The comers 58 are rounded to allow for rotation within the first and second vertical shafts 36,38.

The base 34 includes first and second ends 62,64 and defines a hole 66 between the base ends 62,64. The first end 62 is cut at an angle to give the first vertical shaft 36 clearance over the first end 62 as the lower arm 30 rotates the first vertical shaft 36 to its uppermost position. The second end 64 is attached to the second vertical shaft 38 and to the hitch coupler 24. The base 34 is formed from rectangular tubing, having an upper portion removed to receive the lower arm 30 therein when the lower arm is in its lowermost position.

The hole 66 corresponds to a hole 68 defined in the lower rotatable arm 30. The hole 66 in the base 34 aligns with the hole 68 when the lower arm 30 is in its lowermost position. A lock pin 70 is inserted through the holes 66,68 and a lock pin clip 72 (FIG. 3) secures the lock pin in place. The lock pin 70 secures the main support assembly 22 in the lowered position to prevent movement of the actuator 28 and thereby, keep the trailer hitch 10 from tilting the trailer once a payload has been positioned on the trailer platform 20.

The first vertical shaft 36 is formed from rectangular tubing, having an upper and lower end 74,76. The lower end 76 of the first vertical shaft 36 has an open portion 77 which corresponds with allowable rotation of the lower rotatable arm 30. The upper end 74 is attached to the second vertical shaft 38.

The second vertical shaft 38 includes the upper member 78 and the lower member 80. The lower member 80 includes a top end 82 and a bottom end 84. Both the upper and lower members 78,80 are formed from rectangular tubing. The bottom end 84 of the lower member 80 is fixedly attached to the base 34. The top end 82 of the lower member 80 has a part of the rectangular tubing removed to form an open portion 83, which corresponds to the allowable rotation of the connected upper rotatable arm 32.

The upper member 78 of the second vertical shaft 38 is welded to the first vertical shaft 36 above the open portion 77 and is open on the side opposite the first vertical shaft to receive the upper arm 32. The first end 50 of the rotatable upper arm 32 is pivotally attached to the upper member 78. The rectangular tubing that forms the upper member 78 has structure defining a channel 183 for coupling with the upper arm 32 in its uppermost position.

The main support assembly 22 further includes a generally rigid pair of opposed support members 85, connected to the first end 62 of the base 34 and to the lower member 80 of the second vertical shaft 38. The support members 85 are preferably welded to the base 34 and second vertical shaft 38 and provide increased stability to the main support assembly 22. The support members 85 are welded to the opposite side 31,33 of the main support assembly 22 with the base 34, lower rotatable arm 30 and second vertical shaft 38 positioned between them.

As shown in FIGS. 3–4, the hitch coupler 24 includes structure defining a lock pin aperture 86, a centerline 87, and first and second coupling ends 88,90. The centerline 87 is generally perpendicular to the axes A and B about which the lower and upper rotatable arms 30,32 rotates. The hitch coupler 24 is formed from a rectangular shaped tube and attaches to the second end 64 of the base 34. The first coupling end 88 is inserted into the second end 64 of the base 34 and then welded into place.

The second coupling end 90 is configured to couple with a towing connector 92 on the towing vehicle 94. The towing connector 92 includes a support anchor tube 96 of square shape in transverse cross section having a square opening 98 and with aligned lock pin openings 100 in spaced side walls 102. The second coupling end 90 slides into and through the square opening 98 until the lock pin openings 100 are aligned with the lock pin aperture 86. A lock pin 104 is inserted through the lock pin aperture 86 and lock pin openings 100 to achieve a rigid condition between the towing vehicle 94 and the tilting trailer hitch 10.

As shown in FIGS. 2–4, the hitching mechanism 26 is attached to the main support assembly 22 by an L-shaped plate 106. The L-shaped plate 106 includes a bottom member 108 and a side member 110. The bottom member 108 extends away from the towing vehicle 94 and towards the trailer 12, and couples with the hitching mechanism 26. The side member 110 is welded to the first vertical shaft 36. The hitching mechanism 26 is preferably a hitching ball, but other towing attachments could be used as well.

The trailer 12 is configured to couple with the hitching mechanism 26. The hitching mechanism 26 allows the trailer 12 to pivot and turn in the horizontal plane while following the movements of the towing vehicle 94. Further, the hitching mechanism 26 allows the towing end 21 of the trailer 12 to be raised upwards without having to be uncoupled.

Preferably, first and second actuators 28 are pivotally connected to the main support assembly 22. The actuators 28 are connected to the upper end 74 of the first vertical shaft 36 and to the base 34 outside of the support members 85 on the opposite sides of the support assembly 22. As shown in FIG. 6, the actuators 28 are spaced apart a distance which is greater than the rectangular shaped tubing of the main support assembly 22 located between them.

The actuators 28 are preferably pneumatic shocks having an extended uppermost position 112 and a retracted lowermost position 114. The extended uppermost position 112 is achieved when a force less than a predetermined force is applied to the actuators 28. The retracted lowermost position 114 is achieved when sufficient force is applied to the actuators 28 to cause a downward movement of the main support assembly 22 till the lower rotatable arm 30 partially rests on a portion of the base 34. A spacer 113 is preferably positioned in the base 34 to assure alignment between the locking holes 66,68.

When the actuators 28 are in the retracted position 114, the main support assembly 22 is in an expanded position with the hitch ball 26 lowered and thus, ready for the trailer to be towed. When expanded, the actuators 28 are in a diagonal position and the components of the main support assembly 22 form a rectangular shape. When the actuators 28 are in the extended position 112, the main support assembly 22 is in a compressed position having the hitch ball raised for loading. The actuators 28 vertical shafts, and arms are in a generally vertical orientation and substantially parallel with one another.

As shown in FIGS. 2–3, the trailer 12 is loaded and the tilting trailer hitch 10 is shown with the actuators 28 in the retracted position 114. The force applied by the loaded trailer 12 causes the main support assembly 22 to be in its lowermost position. In this position lock pin 70 can be inserted through the holes 66,68 in the base and lower arm 30 respectively and locked and ready for transport.

FIG. 4 illustrates the main actuator assembly 22 while the trailer 12 is being unloaded. As the weight of the trailer decreases and the force placed upon the hitching mechanism 26 consequently decreases, the hitching mechanism 26 is raised along a generally arcuate path 116. The lower and upper arms 30,32 area rotated from a generally horizontal, spaced apart position to an adjacent vertical position. The first vertical shaft 36 and upper member 78 of the second vertical shaft 38 are also raised along the generally arcuate path 116 until they are substantially vertically aligned. Thus, the actuators are passive actuators in that an operator does not directly manipulate the actuators. Rather, the forces places on the trailer operate the shocks.

Referring again to FIGS. 5 and 6, the trailer 12 is unloaded and the tilting trailer hitch 10 is shown with the pair of actuators 28 in the extended position 112. The actuators have rotated a portion of the main support assembly 22 to an uppermost position because little or no force is applied to the hitching mechanism 26. The upper and lower rotatable arms 30,32 are generally vertical and adjacent to another. The first and second vertical shafts 36,38. are coupled with the upper and lower rotatable arms 30,32.

In the extended position 112 the trailer 12 is tilted and ready to be easily loaded. As a payload is moved onto the platform 19 of the trailer 12, the force acting upon the hitching mechanism 26 increases and thus begins to automatically force the actuators 28 to retract. The trailer 12 will gradually become less tilted as the weight is moved toward the towing end 21 of the trailer 12 over and past the wheels 14 which act as fulcrum. The hitching mechanism 26 will be lowered along the generally arcuate path 116.

Those skilled in the art will now appreciate the benefits of the present invention. For example, the use of a pneumatic shock as actuators 28 decreases the complexity, thereby decreasing the manufacturing costs. Another benefit is that the tilting trailer hitch 10 can be easily removed from the towing vehicle 94. Because it can be easily removed, it is simple to transfer the trailer hitch 10 to another vehicle. Also, because the tilting trailer hitch 10 lowers the loading end of the trailer 20 automatically when unloaded and raises the loading end 20 automatically when loaded, only one person is required to load or unload vehicles or machinery.

Those skilled in the art will also appreciate that the present invention encompasses many variations in the preferred embodiments described herein. The preferred embodiment has a pair of actuators 28, but a single actuator could be used to raise and lower the main support assembly 22. As another example, the actuator 28 in the preferred embodiment is a pneumatic shock absorber, but the actuator 28 could be a hydraulic cylinder with a piston rod member. Additionally, although the preferred actuators 28 automatically extend and retract in response to the weight placed on the hitching mechanism 26, a mechanism such as a pump could be used to selectively extend and retract the actuator. Further, the main support assembly 22 is constructed from rectangularly shaped tubing, but any type of appropriate beam or tubing could be used.

Having thus described the preferred embodiments of the present invention, the following is claimed as new and desired to be secured by Letters Patent:

1. A tilting trailer hitch connectable between a towing vehicle and a trailer comprising:
   a main support assembly having a plurality of pivot connections;
   a hitch coupler attached with the main support assembly and configured to connect the main support assembly to the towing vehicle;
   a hitching mechanism attached to the main support assembly, suited for coupling to a trailer to be towed by towing vehicle;
   at least one actuator pivotally connected to the main support assembly and being operable to rotate a portion of the main support assembly thereby raising the hitching mechanism along a generally arcuate path to an uppermost position and lowering the hitching mechanism to a lowermost position; and
   the main support assembly comprising a compressed, loading position and an expanded travel position, and the actuator being operative to automatically move the main support assembly between the compressed position and the expanded position in response to trailer loading.

2. The tilting trailer hitch as set forth in claim 1 wherein the main support assembly includes at least one rotatable arm being rotatable between a generally vertical position and a generally horizontal position.

3. The tilting trailer hitch as set forth in claim 2 wherein the hitch coupler includes a centerline and the rotatable arm rotates about an axis which is generally perpendicular to the hitch coupler centerline.

4. The tilting trailer hitch as set forth in claim 1 wherein the main support assembly comprises rectangular tubing.

5. The tilting trailer hitch as set forth in claim 1 further including another actuator, each actuator connected to substantially opposite sides of the main support assembly.

6. A tilting trailer hitch in combination with a trailer, the tilting trailer hitch comprising:
   a main support assembly having an upper rotatable arm, a lower rotatable arm, a base, a first vertical shaft, and second vertical shaft defining a compressible frame;
   a hitching mechanism configured to couple with the trailer, connected to the first vertical shaft;
   a hitch coupler attached to the base, coupled with a towing vehicle; and
   a pair of actuators pivotally connected to the main support assembly, configured to rotate a portion of the main support assembly to in uppermost position when less than a predetermined amount of force is applied to the hitching mechanism and to a lowermost position when greater than a predetermined amount of force is applied to the hitching mechanism.

7. The trailer hitch as set forth in claim 6, wherein the hitch coupler includes a centerline and the upper and lower rotatable arms rotate about an axis which is generally perpendicular to the centerline of the hitch coupler.

8. The trailer hitch as set forth in claim 6, wherein the frame is at least partially constructed from rectangular tubing.

9. The trailer hitch as set forth in claim 6, wherein in the uppermost position the lower rotatable arm is configured to couple with the first vertical shaft and the upper rotatable arm is configured to couple with the second vertical shaft.

10. The trailer hitch as set forth in claim 6, wherein the frame is located between the pair of actuators.

11. A method of loading a payload on a trailer using a trailer hitch coupled with a towing vehicle, the trailer having a towing end, a loading end and a pair of wheels, the trailer hitch having a main support assembly, a hitching mechanism, and an actuator pivotally connected to the main support assembly, the method comprising the steps of:
   (a) coupling the towing end of the trailer with the hitching mechanism of the trailer hitch;
   (b) extending the actuator to present the hitching mechanism in an uppermost position;
   (c) tilting the trailer with the loading end being positioned adjacent to the ground;
   (d) moving the payload from the ground to the loading end;
   (e) retracting the actuator as the weight of the payload on the trailer increases and moves towards the towing end;
   (f) lowering the hitching mechanism gradually along a generally arcuate path,
   (g) raising the loading end of the trailer; and
   (h) positioning the payload at a desired location, where the trailer hitch presents the actuator in a retracted position, the hitching mechanism in a lowermost position, and the trailer generally parallel to a support surface.

12. The method as set forth in claim 11, further including the step of locking the trailer hitch by inserting a lock pin into the main support assembly to prevent movement of the actuator.

13. The method as set forth in claim 11 wherein extending and retracting the actuator comprised automatically extending and retracting the activator.

14. A tilting trailer hitch connectable between a towing vehicle and a trailer comprising:
   a main support assembly having a plurality of pivot connections;
   a hitch coupler attached with the main support assembly and configured to connect the main support assembly to the towing vehicle;

a hitching mechanism attached to the main support assembly, suited for coupling to a trailer to be towed by the towing vehicle;

at least one actuator pivotally connected to the main support assembly and being operable to rotate a portion of the main support assembly thereby raising the hitching mechanism along a generally arcuate path to an uppermost position and lowering the hitching mechanism to the lowermost position;

the main support assembly including at least one rotatable arm being rotatable between a generally vertical position and a generally horizontal position; and the main support assembly further including a base, and in the generally horizontal position, the rotatable arm rests on a portion of the base.

15. The tilting trailer hitch as set forth in claim 14 wherein the main support assembly further includes a pair of support members.

16. A tilting trailer hitch connectable between a towing vehicle and a trailer comprising:

a main support assembly having a plurality of pivot connections;

a hitch coupler attached with the main support assembly and configured to connect the main support assembly to the towing vehicle;

a hitching mechanism attached to the main support assembly, suited for coupling to a trailer to be towed by the towing vehicle;

at least one actuator pivotally connected to the main support assembly and being operable to rotate a portion of the main support assembly thereby raising the hitching mechanism along a generally arcuate pate to an uppermost position and lowering the hitching mechanism to a lowermost position; and the actuator being operative to raise the hitching mechanism along a generally arcuate path to its uppermost position when less than a predetermined amount of weight is acting upon the hitching mechanism.

17. A tilting trailer hitch connectable between a towing vehicle and in combination with a trailer comprising:

a main support assembly having a plurality of pivot connections;

a hitch coupler attached with the main support assembly and configured to connect the main support assembly to the towing vehicle;

a hitching mechanism attached to the main support assembly, suited for coupling a trailer to be towed by the towing vehicle;

at least one actuator pivotlly connected to the main support assembly and being operable to rotate a portion of the main support assembly thereby raising the hitching mechanism along a generally arcuate path to an uppermost position and lowering the hitching mechanism to a lowermost position; and the trailer further including a loading end, a towing end, and at least one pair of wheels acting as a fulcrum and wherein the at least one actuator is configured to the lower the hitching mechanism along the arcuate path when weight is added to the trailer on the towing end side of the pair of wheels.

18. A tilting trailer hitch connectable between a towing vehicle and a trailer comprising:

a main support assembly having a plurality of pivot connections;

a hitch coupler attached with the main support assembly and configured to connect the main support assembly to the towing vehicle;

a hitching mechanism attached to the main support assembly, suited for coupling to a trailer to be towed by the towing vehicle;

at least one actuator pivotally connected to the main support assembly and being operable to rotate a portion of the main support assembly thereby raising the hitching mechanism along a generally arcuate path to an uppermost position and lowering the hitching mechanism to a lowermost position; and the main support assembly includes an upper rotatable arm and a lower rotatable arm operable to maintain a substantially parallel relationship to the upper rotatable arm throughout operation of the hitch, a base, and first and second generally upright shafts defining a frame.

19. A tilting trailer hitch connectable between a towing vehicle and a trailer comprising:

a main support assembly having a plurality of pivot connections;

a hitch coupler attached with the main support assembly and configured to connect the main support assembly to the towing vehicle;

a hitching mechanism attached to the main support assembly, suited for coupling to a trailer to be towed by the towing vehicle;

at least one actuator pivotally connected to the main support assembly and being operable to rotate a portion of the main support assembly thereby raising the hitching mechanism along a generally arcuate path to an uppermost position and lowering the hitching mechanism to a lowermost position; and the actuator comprises a pneumatic shock.

20. A tilting trailer hitch connectable between a towing vehicle and a trailer comprising:

a main support assembly having a plurality of pivot connections;

a hitch coupler attached with the main support assembly and configured to connect the main support assembly to the towing vehicle;

a hitching mechanism attached to the main support assembly, suited for coupling to a trailer to be towed by the towing vehicle;

at least one actuator pivotally connected to the main support assembly and being operable to rotate a portion of the main support assembly thereby raising the hitching mechanism along a generally arcuate path to an uppermost position and lowering the hitching mechanism to a lowermost position; and the at least one actuator comprising a passive actuator.

* * * * *

UNITED STATES PATENT AND TRADEMARK OFFICE
CERTIFICATE OF CORRECTION

PATENT NO. : 6,155,588
DATED : December 5, 2000
INVENTOR(S) : Maxey

It is certified that error appears in the above-identified patent and that said Letters Patent is hereby corrected as shown below:

Claims 6, column 6,
Line 12, delete "in" and insert -- an --.

Claim 16, column 7,
Line 32, delete "pate" and insert -- path --.

Claim 17, column 7,
Line 49, delete "pivotlly" and insert -- pivotally --.

Claim 17, column 7,
Line 57, delete "the", second occurrence.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*